Patented Sept. 1, 1953

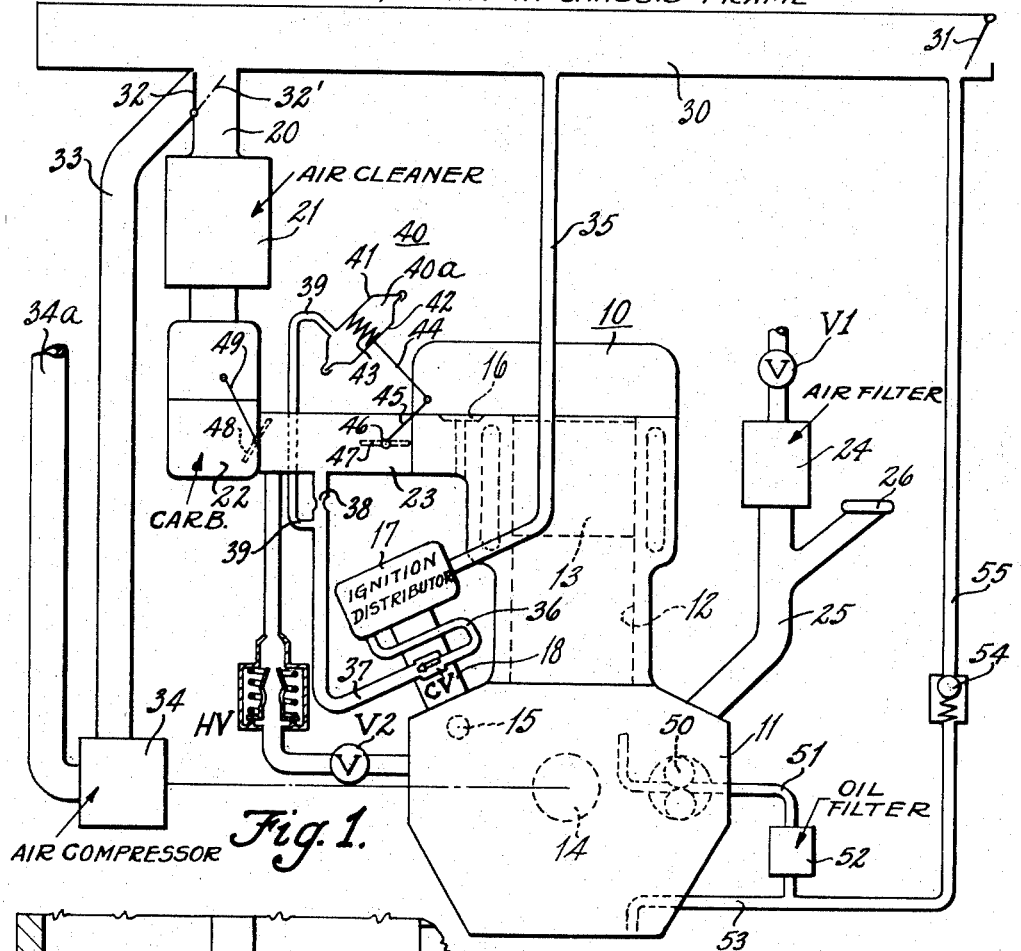
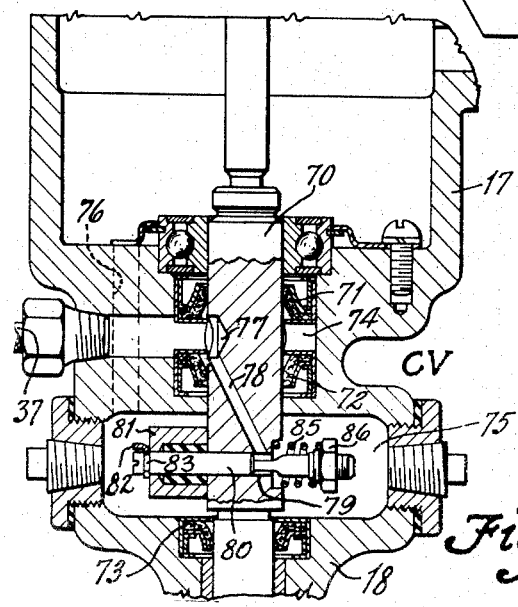
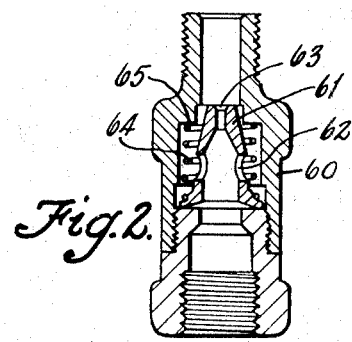

2,650,577

UNITED STATES PATENT OFFICE 2,650,577

VENTILATING SYSTEM

Max G. Bales, Anderson, Ind., assignor to General Motors Corporation, Detroit, Mich., a corporation of Delaware Application February 23, 1951, Serial No. 212,457

8 Claims. (Cl. 123—1)

This invention relates to automotive vehicles which are required to ford streams of such depths that the engine may be submerged.

An object of the invention is to provide a ventilating system for the engine crank case and the ignition distributor having means for preventing entrance of water when fording. To accomplish this, the invention provides means for closing the system and pressurizing it during fording.

Further objects and advantages of the present invention will be apparent from the following description, reference being had to the accompanying drawings wherein a preferred embodiment of the present invention is clearly shown.

In the drawings:

Fig. 1 is a diagram of a ventilating system embodying the invention.

Figs. 2 and 3 are respectively enlarged sectional views of valves HV and CV included in Fig. 1.

Referring to the Fig. 1, an engine 10 includes a crank case 11 supporting a plurality of cylinders one of which is shown at 12. Each cylinder receives a piston 13 connected with a crank shaft 14 which through gears, not shown, drives a cam shaft 15 for controlling the engine valves one of which is shown at 16. Shaft 15 drives an ignition distributor 17 the housing of which includes a tubular member 18 supported by the crank case 11 and enclosing a shaft which transmits motion from the shaft 15 to moving parts of the distributor.

Air enters through pipe 20 and passes through an air cleaner 21 and into a carburetor 22 connected with engine intake manifold 23. Air for crank case ventilation passes through a valve V1, when open, an air filter 24, and a pipe 25 connected with crank case 11. Through pipe 25 engine oil can be introduced after removal of a filler cap 26.

Air cleaner inlet pipe 20 is connected with an air manifold or gallery 30 provided by the chassis frame of the vehicle. Manifold 30 is closed at one end and is normally open at the other end. When manifold 30 is pressurized during fording, a check valve 31 closes under pressure to close the manifold. A manually operated valve 32 is normally in the full line position to connect manifold 30 with pipe 20. In preparation for fording, valve 32 is moved to position 32' to allow air under pressure to pass into pipe 20 and manifold 30 from a pipe 33 connected with an engine driven air compressor 34, the intake pipe 34a of which extends above the level of any stream which the vehicle can ford.

For distributor ventilation, air enters the housing of distributor 17 through pipe 35 and passes out through a pipe 36 connected by a normally open valve CV and a pipe 37 with manifold 23. Pipe 37 has a restriction 38 to prevent suction in the distributor housing from exceeding suction in the crank case 11 so that splashing engine oil will not be sucked into the distributor housing.

Pipe 37 is connected with a pipe 39 connected with a suction device 40 having a suction chamber 40a between a metal cup 41 and a flexible diaphragm 42 attached at its periphery to the cup. A compression spring 43 normally extends diaphragm 42 as shown. A link 44 connects the diaphragm 42 with a lever 45 connected with a shaft 46 supporting a governor valve 47 in manifold 23. Spring 43 normally holds valve 47 open. When engine speed tends to exceed a certain value, valve CV automatically closes and chamber 40a is then subjected to suction in the manifold 23 and diaphragm 42 moves toward cup 41 to move valve 47 toward closed position thereby limiting the speed of the engine to a certain value and consequently the speed of the vehicle propelled by it.

Below governed speed, engine speed is controlled by throttle valve 48 operated by a lever 49 connected with a throttle pedal not shown.

The intake of the engine driven oil pump 50 is connected by a pipe 51, oil filter 52 and pipe 53 with the oil sump of the crank case. Pipe 53 is connected by ball check valve 54 and pipe 55 with air manifold 30. Valve 54 closes when not fording to prevent oil from entering manifold 30 and opens at 1 p. s. i. air pressure in this manifold.

The crank case 11 is connected by a manually controlled valve V2 and an automatically controlled valve HV with intake manifold 23. Valve HV (Fig. 2) includes a housing 60 which encloses a valve member 61 having side holes 62 and a smaller hole 63. A spring 64 normally holds valve 61 in open position, when intake suction is relatively low as occurs when the engine is operating with the throttle valve 48 wide open. When the engine idles and the intake suction is high, spring 64 is overcome and valve 61 engages a seat 65 so that the small hole 63 of the valve provides the sole connection between valve V2 and intake manifold 23. The function of valve HV is to limit the suction in the crank case 11 while the engine is idling or operating a part throttle while providing sufficient suction for crank case ventilation when the engine is operating with wide open throttle.

Referring to Fig. 3 which shows the details of valve CV, the shaft 70 which rotates the circuit breaker cam and the rotor, not shown, of the distributor 17 is engaged by shaft seals 71, 72 and 73 retained by support 18 thus providing chambers 74 and 75. In Fig. 3, the pipe 36 of Fig. 1 is a duct or passage 76 connecting the housing of distributor 17 with chamber 75. Pipe 37 of Fig. 1 is connected with chamber 74. Chambers 74 and 75 are normally connected by a recess 77, an oblique bore 78 and a cross bore 79 in shaft 70. Bore 79 receives a valve rod 80 supporting a weight 81 retained by a clip 82 received by a groove 83 of rod 80. A spring 85 retained by a self-locking nut 86 threaded on rod 80 urges the rod into valve-open position so that pipes 38 and 39 are normally connected. At a certain rotative speed of shaft 70, centrifugal force acting on weight 81 overcomes spring 85 and valve rod 80 moves left in Fig. 3 to block connection between bores 77 and 78. When that happens the chamber 40 will then be subjected to partial vacuum to move the governor valve 47 toward closed position.

To prepare for fording, valves V1 and V2 are closed, valve 32 is moved to position 32' and the air compressor 34 is connected with the engine by a suitable clutch, not shown. Manifold 30 receives air under pressure and valve 31 closes. The carburetor 22, the ignition distributor 17 and the crank case 11 are pressurized and are ventilated, while fording, through suction produced by the engine.

While the embodiment of the present invention as herein disclosed, constitutes a preferred form, it is understood that other forms might be adopted.

What is claimed is as follows:

1. A ventilating system for a crank case and a sealed ignition distributor of an internal combustion engine comprising; a carburetor and an intake manifold associated with the engine; an air manifold open at one end associated with the carburetor and the distributor; an air inlet associated with the crank case including a valve adapted to be closed, when fording; air outlet ducts associated with the crank case, the distributor and the intake manifold; a valve movable in the air manifold, said valve being movable responsively to air pressure in the air manifold; means for admitting air pressure to the air manifold to actuate said pressure valve to close the open end of the air manifold and maintain it closed whereby the carburetor, the distributor, and the crank case are pressurized and are ventilated, while fording, through suction produced by the engine.

2. A ventilating system for a crank case and a sealed distributor of an internal combustion engine comprising, an air manifold open at one end, a valve responsive to air pressure for closing the open end of the air manifold; an air inlet duct leading to the crank case including a manually operative valve adapted to be closed, when fording; an air duct connecting the air manifold with the distributor; a carburetor and an intake manifold associated with the air manifold and the engine; air outlet ducts associated with the crank case and the distributor connected with the intake manifold and means for admitting air under pressure to the air manifold to actuate the pressure valve into and maintain it in closed position to permit the carburetor, the crank case, and the distributor to be pressurized and ventilated, while fording, through suction produced by the engine.

3. A ventilating system for a crank case and a sealed distributor of an internal combustion engine comprising, an air manifold open at one end, a valve responsive to air pressure for closing the open end of the air manifold; a carburetor and an intake manifold associated with the air manifold and the engine; an air inlet duct associated with the crank case including a valve adapted to be closed to prevent entrance of water, when fording; an air outlet associated with the crank case and the intake manifold including a normally opened valve adapted to be closed, when fording; an air inlet duct associated with the distributor and the air manifold; an air outlet associated with the distributor and the intake manifold including a restriction to prevent suction in the distributor from exceeding suction in the crank case so that oil in the crank case will not be sucked into the distributor; and means for admitting air under pressure to the air manifold to actuate the pressure valve into and maintain it in closed position to permit the carburetor, the crank case and the distributor to be pressurized and ventilated, while fording, through suction produced by the engine.

4. A ventilating system for a crank case and a sealed ignition distributor of an internal combustion engine, said system having means for preventing entrance of water when fording comprising, an air manifold open at one end, a valve movable within the air manifold and adapted to close the open end of the air manifold; a carburetor and an intake manifold associated with the air manifold and the engine; a plurality of ducts, said ducts being associated with the air manifold, the crank case, and the intake manifold in a manner to ventilate the crank case and the distributor, when not fording; valve means for closing the ducts associated with the crank case to prevent entrance of water in the system, while fording; and means for supplying air under pressure to the air manifold to actuate the valve to close the open end of the air manifold whereby the carburetor, the distributor and the crank case are pressurized and ventilated while fording, through suction produced by the engine.

5. A ventilating system for a crank case and a sealed distributor of an internal combustion engine comprising, an air manifold open at one end; a carburetor and an intake manifold associated with the engine; an air inlet duct means between the carburetor and the air manifold to permit air to enter the carburetor; air inlet duct means associated with the crank case; air inlet duct means between the air manifold and the distributor; and outlet ducts associated with the distributor, the crank case and the intake manifold for ventilating the distributor and the crank case.

6. A ventilating system for a crank case and a sealed distributor of an internal combustion engine comprising an air manifold open at one end; a valve responsive to air pressure for closing the open end of the air manifold, a carburetor and an intake manifold associated with the engine; an air inlet duct between the air manifold and the carburetor; an air inlet duct associated with the crank case; an air outlet duct associated with crank case and the intake manifold; manually operated valve means adapted to close the ducts associated with the crank case; an air outlet duct associated with the distributor and the intake manifold; and means for admitting air under pressure to the air manifold to actuate the pressure responsive valve to close the open end of the air manifold to permit the air under pressure to ventilate the crank case and the distributor.

7. A ventilating system for a crank case and a sealed distributor of an internal combustion engine comprising; and air chamber closed at one end and normally open at the other end; a valve associated with the air chamber and responsive to pressure for closing the open end of the air chamber; a carburetor and an intake manifold associated with the engine; an inlet air duct associated with the carburetor; an air inlet duct for the distributor connected with the air chamber; an air inlet duct associated with the crank case; an air outlet duct associated with the crank case and the intake manifold; manually controlled valve means for closing the air inlet and outlet ducts associated with crank case against entrance of water while fording; and means for supplying air under pressure to the air chamber to actuate the aforementioned pressure valve to close the open end of the air chamber whereby the carburetor, the distributor and the crank case are pressurized and ventilated while fording, through suction produced by the engine.

8. A ventilating system for a crankcase and a sealed distributor of an internal combustion engine comprising; a carburetor and an intake manifold associated with the engine; an air manifold open at one end; valve means associated with the air manifold, said valve means adapted to close the open end of the air manifold when subjected to air pressure within the manifold; conduit means for conveying air from the manifold to the carburetor, the distributor, and the crankcase; air outlet passages associated with the distributor, the crankcase and the intake manifold; means for closing the crankcase air outlet passage; and means for admitting air under pressure to the air manifold to actuate the pressure valve to close the open end of air manifold whereby the carburetor, the distributor, and the crankcase are pressurized and are ventilated through suction produced by the engine so long as air under pressure is admitted to the air manifold.

MAX G. BALES.

References Cited in the file of this patent
UNITED STATES PATENTS

| Number | Name | Date |
|---|---|---|
| 2,429,732 | Roos | Oct. 28, 1947 |